United States Patent [19]
Kavthekar et al.

[11] 3,857,004
[45] Dec. 24, 1974

[54] LIQUID LEVEL SENSOR

[75] Inventors: Keshav S. Kavthekar, Melvindale; Edwin F. Clemett, Jr., Detroit, both of Mich.

[73] Assignee: McCord Corporation, Detroit, Mich.

[22] Filed: June 8, 1973

[21] Appl. No.: 368,368

[52] U.S. Cl............................ 200/84 C, 340/244 A
[51] Int. Cl............................................. H01h 35/18
[58] Field of Search..... 200/84 R, 84 C; 340/244 A; 73/322.5, 308, 319, 320, 313

[56] References Cited
UNITED STATES PATENTS
2,586,619   2/1952   Davis ................................. 73/322.5
3,408,053  10/1968   Vantroba ......................... 200/84 C FOREIGN PATENTS OR APPLICATIONS
1,116,802   6/1968   Great Britain .................. 340/244 A

*Primary Examiner*—David Smith, Jr.
*Attorney, Agent, or Firm*—McGlynn and Milton

[57] ABSTRACT

A liquid level sensor assembly for indicating, through an electrically-operated warning circuit, the liquid level of a fluid in a container including magnetic responsive switch means for movement between an open and closed position to control an electric circuit, support means for supporting said switch means, float means responsive to the level of the fluid, and magnet means supported by and movable with the float means for actuating the switch means; the support means including a top portion and guide means depending therefrom for guiding the float means, the guide means having a housing portion housing the switch means and a depending pilot portion having radially extending fins wherein this pilot portion is cross-shaped in transverse cross section; the float means being adapted to move axially of the guide means and including a barrel portion surrounding the housing portion and supporting the magnet means and a follower portion depending therefrom and having strap members for engaging the radially extending fin members on the pilot portion to facilitate guided movement of the float means.

16 Claims, 4 Drawing Figures

PATENTED DEC 24 1974      3,857,004
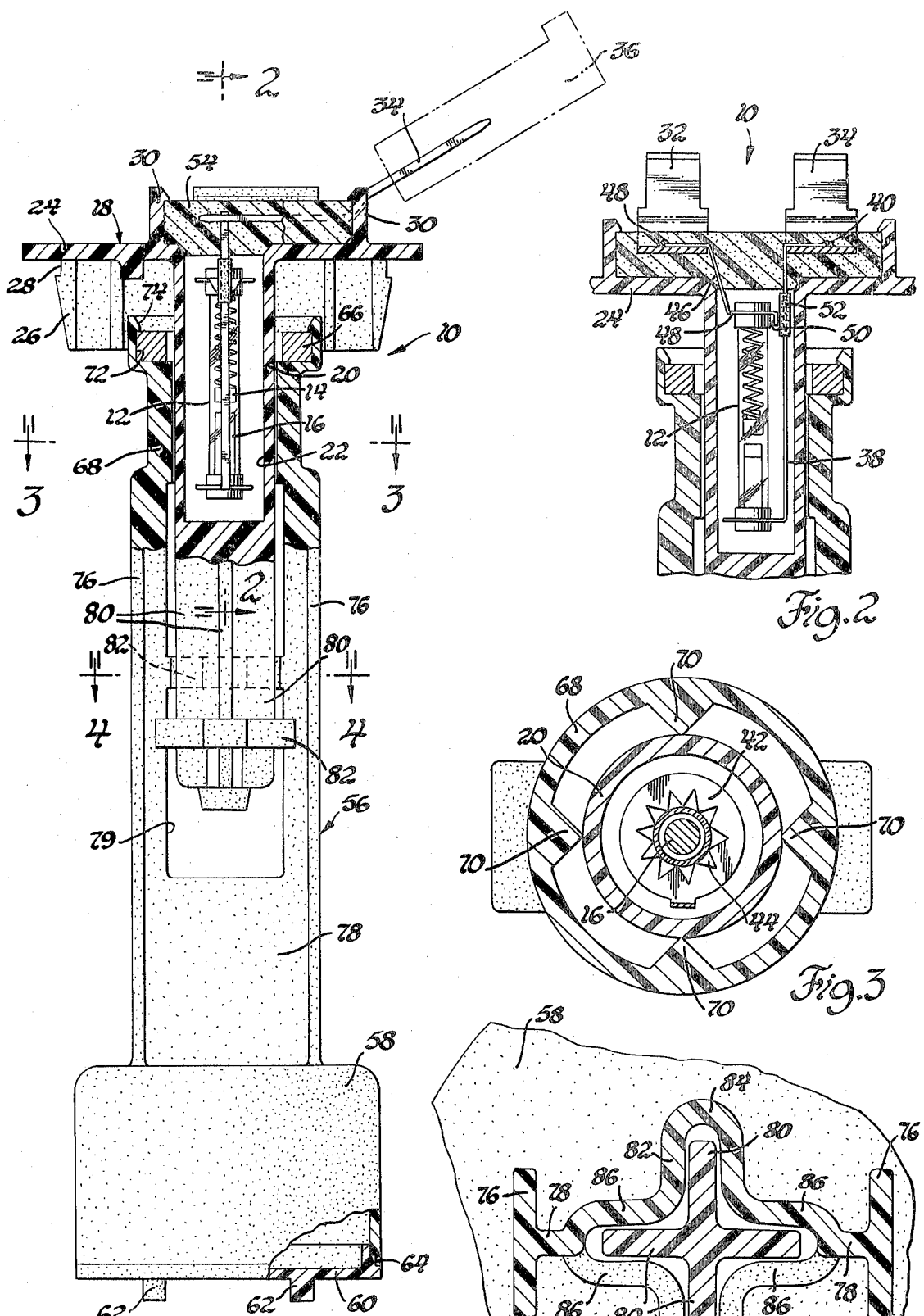

LIQUID LEVEL SENSOR

This invention relates to a liquid level sensor or float switch for indicating, through an electrically-operated warning circuit, the liquid level of a fluid in a container. The invention has particular application in windshield washing systems for automotive vehicles wherein a windshield washing fluid is held in a reservoir for application to the windshield surface during a cleaning operation. It is desirable to monitor the amount of cleaning fluid in the reservoir so that when the level of the fluid reaches a predetermined low level a warning is given indicating the need to replenish the supply of fluid. Heretofore many warning devices of this type, which are manufactured to be relatively dependable, have been unattractive from an economic standpoint for use as an automotive accessory. In other words, fluid level sensors of dependable and sound construction have generally been too expensive for use in windshield washing systems.

It is, therefore, an object and feature of the instant invention to provide a liquid level sensor assembly for indicating, through an electrically-operated warning circuit, the liquid level of a fluid in a container including magnetic responsive switch means for movement between an open and closed position to control an electric circuit, support means for supporting the switch means, float means responsive to the level of the fluid, and magnet means supported by and movable with the float means for actuating the switch means; the support means including a top portion and guide means depending therefrom for guiding the movement of the float means, the guide means having a housing portion for housing the switch means and a pilot portion having radially extending members; the float means being adapted to move axially of the guide means and including a barrel portion surrounding the housing portion and supporting the magnet means and a follower portion depending therefrom and having means for engaging said radially extending members to facilitate guided movement of the float means.

In accordance with the foregoing object and feature it is another object and feature of the instant invention to provide a liquid level sensor assembly wherein the pilot portion of the guide means includes a plurality of radially extending fin members, the pilot portion being generally cross-shaped in transverse cross section and the follower portion includes two parallel spaced-apart flange sections and a web section connecting the flange sections, the web section including an opening therein for receiving the pilot portion and strap members spanning the opening and engaging the fin members.

Other objects and features of the instant invention will be readily appreciated as the same becomes better understood by reference to the following detailed description when considered in connection with the accompanying drawings wherein:

FIG. 1 is a side elevational view partially in cross section of a preferred embodiment constructed in accordance with the instant invention;

FIG. 2 is a broken-away cross sectional view taken generally along line 2—2 of FIG. 1;

FIG. 3 is a transverse cross sectional view taken generally along line 3—3 of FIG. 1; and FIG. 4 is a transverse cross sectional view taken generally along line 4—4 of FIG. 1.

Referring to the drawings, a liquid level sensor assembly for indicating the liquid level of a fluid in a container through an electrically-operated warning circuit is generally shown at 10.

The liquid level sensor assembly 10 includes a magnetic responsive switch means which is actuable by a magnet to close an electric circuit which lights a warning lamp. The magnetic responsive switch means 12 employed in the preferred embodiment of the instant invention comprises an axial switch which includes a movable contact member 14 held in spaced relation from a stationary contact member 16 by means of a coil spring. The movable contact member 14 is made of a magnetic material so that a magnetic field is capable of moving the contact member 14 against the force of the spring into contact with the stationary contact member 16. Other types of magnetic responsive switch means are available, such as a reed switch, and these may be employed in the construction of the liquid level sensor assembly 10 with comparable results.

The switch means 12 is supported in a support member generally indicated at 18. The support member 18 includes a housing portion 20 which is of a generally cylindrical shape and includes an axial bore 22 disposed therein. The axial bore 22 is adapted to receive and house the switch means 12 therein. The entrance to the bore 22 is surrounded by a radially extending flange member 24 or top portion which includes a depending annular closure member 26. As hereinbefore alluded to, the liquid level sensor assembly 10 is adapted for indicating the liquid level in a container. Such a container would normally be provided with a circular opening therein which is adapted to receive the liquid level sensor assembly such that a major portion thereof extends into the container. The radially extending flange 24 and closure member 26 are adapted to close the opening in the container. The closure member 26 is of the snap-in type and includes an annular recess 28 for receiving the inner edge of the circular opening in the container.

The support member 18 also includes upstanding wall members 30 for defining a recess therebetween. The recess is adapted to receive two electric circuit terminal members 32 and 34 which are connected to the magnetic responsive switch means 12. The electric circuit terminal members 32 and 34 are adapted to be received within an electrical socket 36 which comprises a portion of the electrically-operated warning circuit. One of the terminal members 34 includes a conductive metal strip 38 which is welded thereto as at 40 and extends into the bore 22 for connection with one terminal at one end of the magnetic responsive switch means 12. The connection with the switch terminal is facilitated by a circular metal disc 42 or washer having an internal star-shaped cutout 44. The inner points produced by the star-shaped cutout 44 frictionally engage and grip the circular terminal end of the switch means 12, thereby producing a good electrical connection. The other terminal member 32 also includes a conductive metal strip 46 which is welded thereto as at 48 and extends into the bore 22 to the opposite terminal end of the switch means 12. The electrical connection at this end is also made by means of a star washer-like metal disc 48. To avoid contact with the conductive metal strip 38, the upper disc 48 includes a bent-over edge 50 which allows passage of the metal strip 38. Furthermore, the portion of the metal strip 38 immediately adjacent the disc 48 is surrounded by an insulating material 52. It is to be noted that although the electric circuit terminal members 32 and 34 described above provide a suitable and extremely satisfactory assembly for including the switch means 12 in the circuit, many other electrical connections may be employed which are equally adapted for this function. For example, it is within the purview of the invention to provide a one-piece terminal rather than an assembly of two pieces, the terminal and metal strip, as described above.

The lower ends of the terminal members 32 and 34 are surrounded by a resin 54 which protects the welded connections with the metal strips 38 and 46 and also seals closed the open end of the axial bore 22 to prevent moisture from entering. Alternatively, the switch means 12 could be enclosed in a molded plastic member which is cylindrical in shape and adapted to fit within the bore 22. The upper regions of the molded plastic member would house and support the ends of the terminal members 32 and 34. The latter arrangement is provided by employing an injection molding process adapted to enclose the switch means 12 and terminal members 32 and 34 in a protective plastic jacket which could then be assembled into the support member 18. Other manufacturing techniques, such as injection molding the support member 18 and simultaneously encasing the switch means and terminal members in a single molding operation, are also contemplated.

The liquid level sensor assembly 10 further includes float means generally indicated at 56, a major portion of which extends below the support member 18. The float means 56 is movably guided on the support member 18 and is adapted to follow the level of the liquid within the container. In other words, the float means 56 is responsive to the level of the fluid. For this purpose the float means 56 includes a buoyant, fluid-tight, hollow cylindrical member 58 disposed at the lower end thereof.

The float means 56 is made of a molded plastic, and due to the forming operation the end of the hollow cylindrical member 58 remains open after the molding process. The open end is closed by a cap 60 which is spin welded to the sides of the hollow cylindrical member 58 and provides a fluid-tight seal therebetween. The tabs or lugs 62 disposed on the cap 60 are provided to facilitate the spin forming operation; that is, the lugs 62 are adapted to be held in a spinning mandrel to rotate the cap 60. Furthermore, the mating surfaces on the sides or edges of the two members are stepped, as indicated at 64, to further facilitate the spin welding operation.

The float means 56 supports a ring magnet 66 which is supported in close proximity to the magnetic responsive switch means 12. Specifically, the ring magnet 66 is housed in a barrel portion 68 disposed at the upper end of the float means. The barrel portion 68 surrounds the cylindrical switch means housing portion 20 and is axially movable with respect thereto. The barrel portion 68 includes a plurality of radially inwardly extending protrusions 70 which are pointed at their distal ends to establish point contact with the outer surface of the housing portion 20. The point contact between these members facilitate relative movement therebetween by reducing friction, yet eliminating an excessive amount of free play between the members.

The ring magnet 66 is held in an annular recess 72 in the barrel portion 68 and is maintained therein by a snap fit flange 74. As shown, the snap fit flange 74 extends entirely around the annular recess 72; however, the walls of the recess 72 and the snap fit flange 74 may be sectioned rather than continuous to facilitate insertion of the ring magnet 66.

The buoyant member 58 is spaced from the barrel portion 68 such that it extends below the support member 18. The buoyant means 58 is connected to the barrel portion 68 by two parallel spaced-apart flange sections 74 connected by an intermediate web section 78. The web section includes a generally rectangular opening 78 therein which is adapted to freely receive the lower extremity of the support member 18. This lower extremity comprises a pilot portion depending from the housing portion 20 for guiding the movement of the float means 56. The flange sections 76 and web section 78 comprise a follower portion which interacts with the pilot portion to guide the movement of the float means 56.

The pilot portion includes a plurality of radially extending fin members 80, and specifically four radially extending fin members, which in transverse cross section form a cross-shaped member as best shown in FIG. 4. A pair of strap members 82 span the opening 79 in the web 78 and slidably engage the fin members 80. The strap members 82 each includes a U-shaped portion 84 surrounding one of the fin members 80 and two arm members 86 connecting the terminal ends of the U-shaped portion 84 to the web section 78. The strap members 82 are disposed on opposite sides of the guide means and function to stabilize the movement of the float means 56 relative to the support member 18.

In operation the float means 56 is adapted to follow the liquid level of the fluid in a container. The position of the float means 56 shown in FIG. 1 corresponds to a sufficiently high liquid level such that the movable contact member 14 is held out of contact with the contact member 16. As the liquid level in the container drops as it is expended for use, the float means 56 and, consequently, the magnet 66 also descend until the magnet 66 passes below the movable contact member 14. The magnetic field created by the magnet 66 attracts the contact 14 and forces it downwardly against the bias of the coil spring and into contact with the stationary contact member 16. When contact between the two members 14 and 16 has been established an electric current is allowed to flow across the terminals 32 and 34 completing an electric circuit which lights a warning lamp. In the case of an automotive vehicle, the warning lamp is disposed in visual proximity to the operator of the vehicle so that he is alerted to the depleted supply of windshield washing fluid.

While a specific form of the invention has been illustrated and described in the foregoing specification and accompanied drawings, it is to be understood that the invention is not limited to the exact construction shown but that various alternatives in the construction and arrangement of parts will become apparent to those skilled in the art without departing from the scope and spirit of the invention embodied in the depending claims.

The embodiments of the invention in which an exclusive property or privilege is claimed are defined as follows:

1. A liquid level sensor assembly for indicating, through an electrically-operated warning circuit, the liquid level of a fluid in a container comprising magnetic responsive switch means for movement between an open and closed position to control an electric circuit, support means for supporting said switch means, float means responsive to the level of the fluid, and magnet means supported by and movable with said float means for actuating said switch means; said support means including a top portion and guide means depending therefrom for guiding said float means, said guide means having a housing portion housing said switch means and a pilot portion having radially extending members with said housing means disposed adjacent said support means and said pilot portion disposed axially below said housing portion, said float means being adapted to move axially of said guide means and including a barrel portion guided by and surrounding said housing portion and supporting said magnet means and a follower portion depending axially below said barrel portion and having means for engaging said radially extending members to facilitate guided movement of said float means; said float means further including a buoyant member disposed axially below said follower portion.

2. An assembly as set forth in claim 1 wherein said guide means includes a plurality of radially extending fin members.

3. An assembly as set forth in claim 2 wherein said follower portion includes two parallel, spaced-apart flange sections and a web section connecting said flange sections; said web section including an opening therein for receiving said pilot portion and strap members spanning said opening and engaging said fin members.

4. An assembly as set forth in claim 3 wherein said pilot portion is generally cross-shaped in transverse cross section.

5. An assembly as set forth in claim 4 wherein each of said strap members includes a U-shaped portion surrounding one of said fin members and two arm members connecting the terminal ends of said U-shaped portion to said web section.

6. An assembly as set forth in claim 5 including two strap members, one disposed on each side of said guide means.

7. An assembly as set forth in claim 6 wherein said barrel portion includes radially inwardly extending protrusions for sliding engagement with the surface of said housing portion.

8. An assembly as set forth in claim 7 wherein said support means includes electrical circuit terminal members connected to said magnetic responsive switch means.

9. An assembly as set forth in claim 8 wherein said support means includes an axial bore disposed in said housing portion for receiving said switch means.

10. An assembly as set forth in claim 9 including a sealing and electrical insulating material surrounding a portion of said terminal members and sealing said axial bore.

11. An assembly as set forth in claim 10 wherein said support means includes upstanding wall members for defining a recess for receiving said terminal members and said sealing material.

12. An assembly as set forth in claim 11 wherein said buoyant member comprises a fluid-tight, hollow, cylindrical member.

13. An assembly as set forth in claim 12 wherein said magnetic responsive switch means is a spring-biased axial switch.

14. An assembly as set forth in claim 1 wherein said barrel portion includes radially inwardly extending protrusions for sliding engagement with the surface of said housing portion.

15. An assembly as set forth in claim 14 wherein said protrusions are triangularly shaped in transverse cross section, the apexes of said protrusions engaging said housing portion surface.

16. An assembly as set forth in claim 1 wherein said support means includes an axial bore disposed in said housing portion for receiving said switch means.

* * * * *